United States Patent
Jaschke et al.

(10) Patent No.: US 12,530,792 B2
(45) Date of Patent: Jan. 20, 2026

(54) SYSTEM AND METHOD FOR PROVIDING ASSISTANCE DURING BOTTLE-FEEDING

(71) Applicant: KONINKLIJKE PHILIPS N.V., Eindhoven (NL)

(72) Inventors: Lena Maria Jaschke, Eindhoven (NL); Priyanka Singhvi, Eindhoven (NL); Franciscus Nicolaas Kockx, Tegelen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 404 days.

(21) Appl. No.: 17/928,025

(22) PCT Filed: Jun. 21, 2021

(86) PCT No.: PCT/EP2021/066733
§ 371 (c)(1),
(2) Date: Nov. 28, 2022

(87) PCT Pub. No.: WO2022/002651
PCT Pub. Date: Jan. 6, 2022

(65) Prior Publication Data
US 2023/0222683 A1   Jul. 13, 2023

(30) Foreign Application Priority Data
Jun. 30, 2020   (EP) .................................... 20183016

(51) Int. Cl.
*G06T 7/70*     (2017.01)
*G06T 11/00*    (2006.01)
(Continued)

(52) U.S. Cl.
CPC ................ *G06T 7/70* (2017.01); *G06T 11/00* (2013.01); *G06V 20/41* (2022.01); *G06V 40/11* (2022.01);
(Continued)

(58) Field of Classification Search
None
See application file for complete search history.

(56) References Cited

U.S. PATENT DOCUMENTS 5,873,551 A     2/1999   Jones
7,850,504 B2 *  12/2010  Goldberg .................. A61J 9/00
                                                   446/73
(Continued)

FOREIGN PATENT DOCUMENTS

CN    110339067 A    10/2019
CN    209769386 U    12/2019
(Continued)

OTHER PUBLICATIONS https://en.wikipedia.org/wiki/Infant_mortality, downloaded on Feb. 3, 2020.
(Continued)

*Primary Examiner* — Vikkram Bali

(57) ABSTRACT

A system provides assistance during bottle-feeding. Video images of a subject bottle-feeding an infant are captured and displayed. Using image analysis, a reorientation of the bottle and/or infant is determined that is required in order to reach a desired bottle orientation and/or infant orientation. Reorientation instructions are provided in combination with the video images to assist the subject in reorienting the bottle and/or the infant to achieve the desired bottle orientation.

20 Claims, 2 Drawing Sheets

(51) Int. Cl.
*G06V 20/40* (2022.01)
*G06V 40/10* (2022.01)
*G09B 5/06* (2006.01)

(52) U.S. Cl.
CPC .... *G09B 5/065* (2013.01); *G06T 2207/10016* (2013.01); *G06T 2207/30004* (2013.01); *G06T 2207/30196* (2013.01)

(56) References Cited

U.S. PATENT DOCUMENTS

| | | | |
|---|---|---|---|
| 2006/0278597 | A1 | 12/2006 | Daugherty et al. |
| 2008/0203049 | A1 | 8/2008 | Goldberg et al. |
| 2011/0266245 | A1 | 11/2011 | Lau |
| 2016/0143814 | A1 | 5/2016 | Lau |
| 2016/0292984 | A1 | 10/2016 | Pradeep et al. |
| 2017/0132498 | A1* | 5/2017 | Cohen .................. G06N 5/022 |
| 2018/0197629 | A1* | 7/2018 | Zhou ..................... G16H 20/60 |
| 2020/0129380 | A1* | 4/2020 | Sazonov ................ A61J 9/008 |

FOREIGN PATENT DOCUMENTS

| | | |
|---|---|---|
| JP | 2004113746 | 4/2004 |
| JP | 2005007042 A | 1/2005 |
| KR | 20120128360 A | 11/2012 |
| KR | 20180128148 A | 12/2018 |
| WO | 2016030586 A2 | 3/2016 |
| WO | 2019167087 A1 | 9/2019 |

OTHER PUBLICATIONS https://metro.co.uk/2018/06/22/baby-choked-death-milk-mother-fell asleep-feeding-7652854/, downloaded on Feb. 3, 2020.
https://www.bbc.com/news/uk-england-lincolnshire-43016506, dated Mar. 7, 2017.
International Search report and Written Opinion of PCT/EP2021/066733, dated Sep. 28, 2021.

* cited by examiner

SYSTEM AND METHOD FOR PROVIDING ASSISTANCE DURING BOTTLE-FEEDING

CROSS-REFERENCE TO PRIOR APPLICATIONS

This application is the U.S. National Phase application under 35 U.S.C. § 371 of International Application No. PCT/EP2021/066733, filed on Jun. 21, 2021, which claims the benefit of European Patent Application No. 20183016.3, filed on Jun. 30, 2020. These applications are hereby incorporated by reference herein.

FIELD OF THE INVENTION

This invention relates to bottle-feeding of an infant (e.g. a baby), and in particular it relates to a system and method for assisting in correctly holding the bottle and/or the infant.

BACKGROUND OF THE INVENTION

Bottle-feeding an infant is a more complicated process than many may suspect. The angle at which an infant is fed during bottle-feeding is crucial to a feed which is comfortable for the infant and which allows the infant to receive the correct amount of milk.

For example, an incorrect feeding technique, such as an incorrect bottle angle, can cause too much air to enter the stomach and in extreme cases can possibly cause choking or loss of breath. The correct feeding technique means that all the milk is administered correctly, with reduced gas and colic, and helps to avoid over feeding and under feeding of the infant.

Colic for example is caused by air in the digestive system. Air can enter into a teat region of a feeding bottle if the liquid level within the feeding bottle drops below a certain level and/or the feeding bottle is provided to the infant in a horizontal position. However, a horizontal or near-horizontal feeding position may be preferred (depending on the orientation of the infant) since it may more closely mimic the natural feeding position.

Thus, there is a relatively narrow optimum range of angles for the baby bottle (relative to the infant), and this can create difficulties for the mother or other caregiver in achieving a successful feed.

SUMMARY OF THE INVENTION

The invention is defined by the claims.

According to examples in accordance with an aspect of the invention, there is provided an image processor for use in a system for providing assistance during bottle-feeding, comprising:
- an input for receiving video images of a subject bottle-feeding an infant;
- an output for providing video images for display, wherein the image processor is adapted to:
  - identify the infant within the video images;
  - determine the orientation of the infant;
  - identify the bottle within the video images;
  - determine the orientation of the bottle;
  - determine a required reorientation of the bottle and/or infant in order to reach a desired bottle orientation; and
- control the display device to output reorientation instructions overlaid over the video images to assist the subject in reorienting the bottle and/or the infant to achieve the desired bottle and/or infant orientation.

This image processor performs image analysis to provide real time assistance to a subject (e.g. mother of an infant or other caregiver) during bottle-feeding of an infant. In particular, the processor determines a desired bottle orientation and/or infant orientation, and provides feedback to assist the subject in maintaining the most appropriate bottle angle and/or infant orientation for correctly holding the infant and bottle to achieve a successful feed.

The desired bottle angle depends on the orientation of the infant as well as on the angle relative to the horizontal. Thus, the bottle angle and/or the infant or subject orientation may need to be adjusted to achieve a desired relationship.

The processor may for example provide instructions only for reorienting the bottle if the infant is in a suitable position for feeding. If the infant position is not suitable, the system may then provide instructions for reorienting the infant, before providing instructions for reorienting the bottle.

The reorientation instructions enable the user to be guided throughout the feeding process. The system also keeps the subject engaged by providing positive reinforcement and constant audio and/or visual feedback.

In the case of hospitals, the system can be used to provide the video images to a remote monitoring station to address the issue of hospital under-staffing, by allowing a remote monitoring of multiple feeding processes by one medical person who reviews the video images. Additionally the medical person can tune the angles to provide optimal feedback in specific cases.

The image processor may be adapted to identify the orientation of the hand of the subject in the images, and determine the orientation of the long axis of the bottle as being perpendicular to the orientation of the palm of the hand.

Thus, the bottle orientation may be derived from the hand of the subject (since the hand of the subject may obscure the bottle itself from view). The subject may know that the system is calibrated based on the assumption that the bottle is held with its long axis perpendicular to the palm of the hand. This is a natural feeding posture, whereby the base of the bottle is cupped in the palm of the hand. Thus, identifying the bottle may involve assuming an orientation based on an identified orientation of the hand of the subject which holds the bottle.

The desired bottle orientation may correspond to a tilt angle relative to a body axis of the infant which falls within a predefined range.

The processor may be further adapted to identify the position of the head of the infant and the position of the feeding hand of the subject in the images.

By locating the infant head and the hand, the reorientation information may be provided as augmented reality, showing to the subject the most appropriate bottle angle next to the bottle and hand of the subject.

The processor may be further adapted to identify the pose of the subject in the images.

This pose information is for example based on the head location, arm and shoulder location, sitting or standing pose, and backward or forward orientation. This pose information may assist in determining the manner in which the infant is held, and therefore assists in determining the body axis of the infant. It can also assist in determining the angle at which the bottle is held.

Thus, as much information is extracted from the images as is needed to reliably enable the current bottle orientation, and infant body orientation to be evaluated.

The processor may be adapted to output reorientation instructions as an indication of the desired orientation on the display output.

This provides a visual indication of the desired orientation, which gives an intuitive indication to the subject of how to adapt the way they hold the bottle, or even their feeding position.

The reorientation instructions may comprise arrow indicators located adjacent to the bottle. They may indicate the way the orientation should be adjusted using a visual overlay over the video images. Similar indications may be provided to guide the subject to adapt their position and the way they are holding the infant.

The processor may be adapted to output reorientation instructions using audio signals. Audio signals may additionally, or alternatively, be used, so that the subject does not need to look at a display to benefit from the feedback information.

The invention also provides a system for providing assistance during bottle-feeding, comprising:
- capturing video images of a subject bottle-feeding an infant;
- identifying the infant within the video images;
- determining the orientation of the infant;
- identifying the bottle within the video images;
- determining the orientation of the bottle;
- determining a required reorientation of the bottle and/or infant in order to reach a desired bottle orientation; and
- displaying the video images in combination with output reorientation instructions to assist the subject in reorienting the bottle and/or infant to the desired bottle and/or infant orientation.

The method may comprise identifying the orientation of the hand of the subject in the images, and determining the orientation of the long axis of the bottle to be perpendicular to the orientation of the palm of the hand.

The desired bottle orientation for example corresponds to a tilt angle relative to a body axis of the infant within a predefined range.

The method may further comprise identifying the pose of the subject in the images. The method may comprise providing output reorientation instructions as an indication of the desired orientation on the display output.

The invention also provides a computer program product comprising instructions for implementing the method defined above when said program is run on a processor.

The invention also provides a computer readable medium comprising the computer program product defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
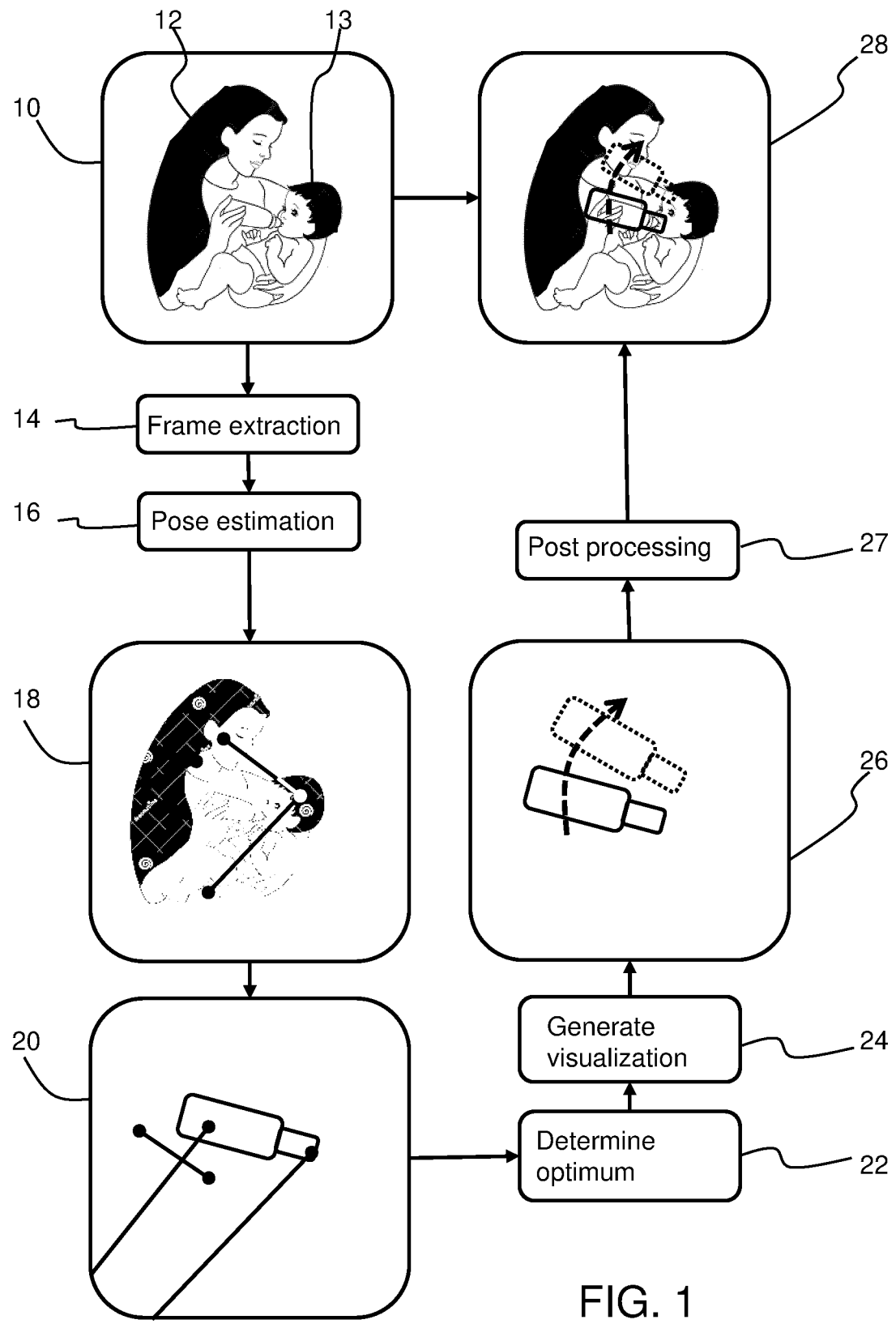
FIG. 1 shows a sequence of image processing steps employed in the system of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a system for providing assistance during bottle-feeding. Video images of a subject bottle-feeding an infant are captured and displayed. Using image analysis, a reorientation of the bottle and/or infant is determined that is required in order to reach a desired bottle orientation and/or infant orientation. Reorientation instructions are provided in combination with the video images to assist the subject in reorienting the bottle and/or the infant to achieve the desired bottle orientation.

FIG. 1 shows a sequence of image processing steps employed in the system of the invention.

Video images 10 are captured of the subject 12 (mother or caregiver) bottle-feeding the infant, e.g. baby, 13. The images may be captured by a mobile device such as a mobile phone. The process may start with the caregiver holding the infant in front of the camera of the mobile device to initiate the recognition process, after which the subject may adopt the feeding pose. The image process may then involve tracking the position of the infant and the subject, after the initial identification. However, the image processing may instead identify all required features without needing any initiation steps. The mobile device then starts taking live video data.

Image preprocessing steps are then carried out, for example based on a grayscale conversion of the images.

In step 14, frame extraction of the images is carried out, and in step 16 3D pose estimation is carried out to identify at least the pose of the infant. In one example, the pose of the subject is also determined. In particular, the orientation at least of the subject's hand and the pose of the infant are determined, with respect to the bottle.

The pose information of the subject also assists in determining the orientation (in three dimensions) of the infant, since the infant orientation can be partly deduced from the pose of the subject.

However, if the image processing is able to locate and analyze the bottle and infant with sufficient accuracy, the pose information of the subject may not be needed, since it is primarily used to deduce the orientation of the bottle, particularly as much of the bottle may be obscured from view.

The pose estimation for example involves running the frames through a neural network to extract 2D key points from each frame. From this, key locations such as the face and body of the infant and the actual bottle holding hand of the subject are identified.

The subject is for example encouraged to hold the bottle in a particular way so that the system can make an assumption about the relationship between the orientation of the bottle-feeding hand of the subject and the long axis of the bottle. For example, the long axis of the bottle may be assumed to be perpendicular to the palm of the hand, i.e. perpendicular to the general plane of the hand.

The correct bottle orientation relative to the hand (so that the assumptions made by the system are valid) may for example be displayed to the subject while they hold the bottle to the camera, so the user can correctly hold the bottle.

The key points and poses of the subject and infant can be converted into a map, as represented by image 18. This may include the head, hands, arms, neck etc. of the subject, the body orientation of the infant, and the viewed or assumed bottle orientation. Image 18 schematically shows the long axis of the baby and the line between the heads of the mother and the infant, at right angles.

Image 20 shows an enlarged area of the region of interest, including the head of the infant, the hand of the subject and hence the bottle.

Suitable image processing algorithms for identifying and tracking features of interest in video data are well known and outside the scope of this application.

In step 22 the optimum bottle angle and/or orientation of the subject is determined.

In a most simple case, the pose of the subject is a suitable feeding pose, so the optimum bottle angle is determined for that particular pose of the subject.

In step 24, a visualization of the optimum bottle angle orientation is generated. This visualization is shown as image 26, and it represents reorientation instructions for the positioning of the bottle.

In a more advanced case, the system may first assess if the subject pose (and hence the infant pose) is suitable for bottle feeding. If not, reorientation instructions or training information may be presented to the subject to improve the way they hold the infant during bottle-feeding.

The instructions for example take the form of arrows and dotted lines to indicate how much the bottle should be shifted from its current location. Similar instructions may be provided for adapting the pose of the subject or the orientation of the infant, or training videos may be provided for this purpose.

After post processing the reorientation instructions in step 27 so that they are compatible for combination with the video images, the reorientation instructions are combined with the original video images, in real time, to overlay the instructions over the real image. This is shown as image 28.

The reorientation instructions may be based on 3D visualization using graphics which show, e.g. using a dotted line, exactly how the bottle should be held. If the subject is unable to constantly look at the screen, audio cues may also be provided that reinforce that the bottle should be moved up, down or the angle adapted. The visualization for example uses augmented reality to provide an optimum visualization.

In professional setting like a hospital, the system may also alert medical staff in a hospital that are remotely monitoring, if the feeding position (of the infant and/or bottle) is not optimized within a specific time frame such that action can be taken timely to support and educate the parents.

Figure 2:
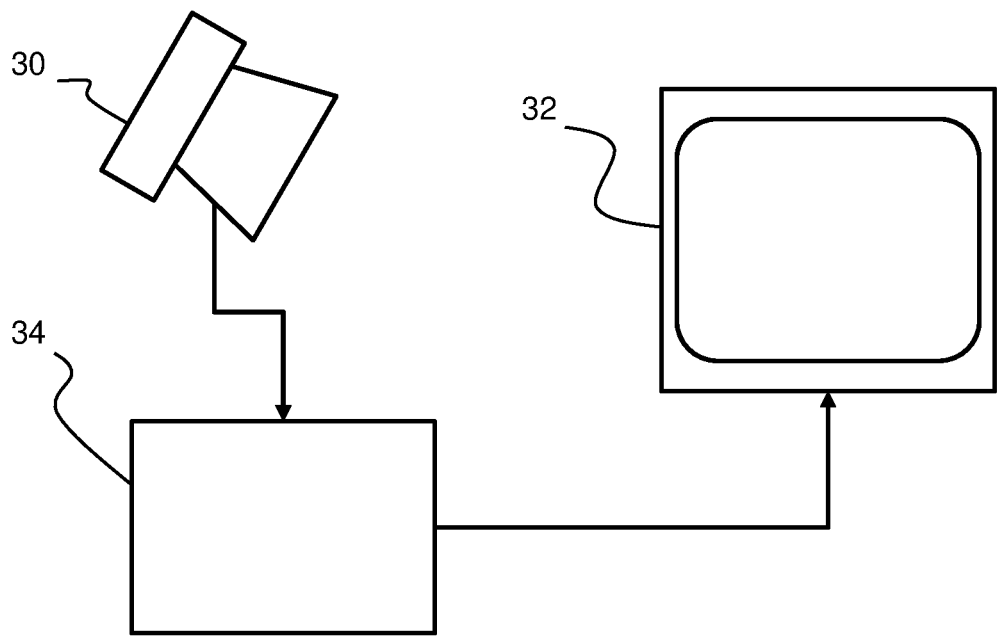
FIG. 2 shows the hardware part of a system.

FIG. 2 shows the hardware components of a system for providing assistance during bottle-feeding, for implementing the process explained above. A camera system 30, which may comprise a single camera, or multiple cameras, or a 3D camera, is for capturing video images of a subject bottle-feeding an infant. The camera system may be a fixed camera or it may be the camera of a mobile device such as a tablet or phone, which the user mounts facing them.

A display 32 is for displaying the video images. The display may be the display of the same mobile device or it may be a separate display to which the images are sent, e.g. by short range communication such as Bluetooth. An audio output system is also provided, for example comprising the speaker of the same mobile device.

An image processor 34 performs the processing described above. The image processor may simply be the processor of the mobile device used as the camera and optionally also the display. Thus, the invention may be implemented as an App to be loaded on a tablet or phone. However, the processing may instead be performed remotely, for example with a local device using short range communication (e.g. a laptop) or even with communication with a remote device over the internet.

The key functions of the image processing are to:
identify the infant within the video images;
determine the orientation of the infant;
identify the bottle within the video images (either by direct recognition or based on assumptions from the image information about the subject);
determine the orientation of the bottle.

Based on the image processing, a required reorientation of the bottle and/or infant, or even a change in posture of the subject, can be determined in order to reach desired feeding conditions.

The desired bottle angle may for example simply be an angle to the horizontal such as 45 degrees. This angle may however depend on the bottle type, and the system may be tuned to the particular type of bottle being used. The infant needs to be in an orientation which enables drinking from the bottle when at the desired bottle angle.

Thus, the bottle angle and/or the infant orientation may need to be adjusted. The desired bottle angle degree gives a downward slope relative to the horizontal to maintain a full teat, and also a suitable angle relative to the body orientation of the infant is also desired so that the baby can comfortably latch on to the bottle teat. The infant should be at a suitable inclination to assist with burping, for example to prevent colic.

The display device is controlled to output reorientation instructions in combination with the video images to assist the subject in reorienting the bottle and/or the infant to achieve the desired bottle orientation. This system keeps the subject engaged by providing positive reinforcement and constant audio and/or visual feedback.

Figure 3:
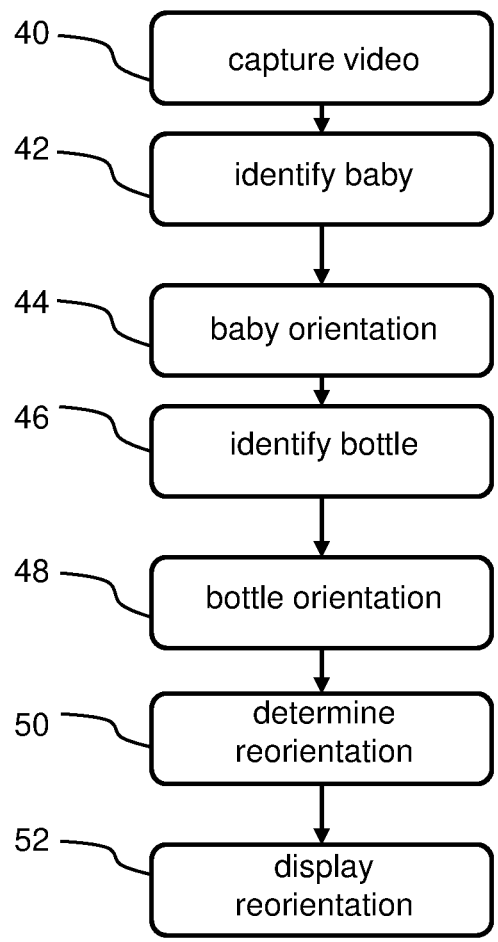
FIG. 3 shows a method for providing assistance during bottle-feeding.

FIG. 3 shows a method for providing assistance during bottle-feeding, comprising:
in step 40, capturing video images of a subject bottle-feeding an infant;
in step 42, identifying the infant within the video images;
in step 44, determining the orientation of the infant;
in step 46, identifying the bottle within the video images; and
in step 48 determining the orientation of the bottle.

A required reorientation of the bottle is determined in step 50 in order to reach a desired bottle orientation.

The video images in combination with output reorientation instructions are displayed in step 52 to assist the subject in reorienting the bottle to the desired bottle orientation.

The method may also start at step 42, for instance when captured video is already available.

The system can additionally be used to track infant feeding patterns and habits. The invention can also be used for research on infant feeding behavior and patterns in hospital as well as home application.

The system may be based entirely on analysis of natural images. However, it is also possible to make use of markers, which can be recognized more easily, such as a marker on the body or face of the infant, and/or a marker on the bottle-holding hand of the subject, and/or markers on the bottle.

The image recognition system may obtain all required pose information automatically, without any special action of the subject. However, the subject may instead provide input, for example with an initial pose in front of the camera as explained above.

The desired bottle angle is for example perpendicular to the body axis of the infant, which is determined as part of the 3D pose information. As a minimum, the system makes use of the infant body orientation, the position of the head of the infant, and the bottle orientation (and position) so that the angle between them can be determined. The angle to the horizontal is also known.

The desired orientation may be obtained as a 3D vector. This may be represented in simplified 2D form, so that for a given pose of the subject and infant, all that is required is alignment of the bottle with a 2D vector on the display, with real time feedback to show when alignment is achieved. 3D directional information may be displayed using more complex representations of the required reorientation.

A 3D vector of the desired orientation may be transferred to 2D space on the screen using augmented reality. Alternatively a representation in 3D on the screen may be selected by the user through a viewing option menu in the user interface.

A more precise estimation of the desired orientation could be created with extra sensors (such as 3D cameras or multiple cameras) giving more detailed bottle position and infant orientation information. Reorientation instructions in the 3D domain could also be given using audio feedback to the user.

The skilled person would be readily capable of developing a processor for carrying out the described method. Thus, each step of the flow chart of FIG. 3 may represent a different action performed by a processor, and may be performed by a respective module of the processing processor.

The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A system for providing assistance during bottle-feeding, the system comprising:
   a processor; and
   a non-transitory memory storing instructions that, when executed by the processor, cause the processor to:
   receive video images of a subject bottle-feeding an infant;
   output the video images to a display device;
   extract video frames from the video images;
   identify the infant within the extracted video frames;
   determine an orientation of the infant by extracting key points from each extracted video frame corresponding to key locations on the infant;
   identify the bottle within the extracted video frames;
   determine an orientation of the bottle;
   determine a required reorientation of the bottle and/or the infant in order to reach a desired orientation between the bottle and the infant; and
   control at least one of the display device or an audio output device to output reorientation instructions to assist the subject in reorienting the bottle and/or the infant to achieve the desired orientation.

2. The system of claim 1, wherein the instructions further cause the processor to identify an orientation of a hand of the subject in the extracted video frames, and to determine an orientation of a long axis of the bottle to be perpendicular to the orientation of a palm of the hand.

3. The system of claim 1, wherein the desired orientation corresponds to a tilt angle relative to a body axis of the infant within a predefined range.

4. The system of claim 1, wherein the instructions further cause the processor to identify a position of a head of the infant and a position of a feeding hand of the subject in the image frames.

5. The system of claim 1, wherein the instructions further cause the processor to identify a pose of the subject in the image frames.

6. The system of claim 1, wherein the instructions further cause the processor to output reorientation instructions as an indication of the desired orientation on the display output.

7. The system of claim 1, wherein the instructions further cause the processor to control an audio output device to output reorientation instructions using audio signals.

8. The system of claim 1, further comprising:
   a camera for capturing the video images of the subject bottle-feeding the infant.

9. The system of claim 1, wherein the instructions further cause the processor to control the display device to display the reorientation instructions overlaid over the video images.

10. The system of claim 1, wherein the instructions cause the processor to determine the orientation of the infant by running the image frames through a neural network to extract the key points from each extracted video frame.

11. A method executed by a processor for providing assistance during bottle-feeding, the method comprising:
automatically extracting video images captured of a subject bottle-feeding an infant using a bottle;
automatically identifying the infant within the extracted video frames;
automatically determining an orientation of the infant by extracting key points from each extracted video frame corresponding to key locations on the infant;
automatically identifying the bottle within the extracted video frames;
automatically determining an bottle orientation of the bottle;
automatically determining a required reorientation of the bottle and/or the infant in order to reach a desired orientation between the bottle and the infant; and
outputting reorientation instructions by displaying the reorientation instructions on a display or outputting the reorientation instructions at an audio output system using audio signals to assist the subject in reorienting the bottle and/or infant to the desired orientation.

12. The method of claim 11, further comprising:
identifying an orientation of a palm of a hand of the subject in the extracted video frames; and
determining an orientation of a long axis of the bottle to be perpendicular to the orientation of the palm of the hand.

13. The method of claim 11, wherein the desired orientation corresponds to a tilt angle relative to a body axis of the infant within a predefined range.

14. The method of claim 11, further comprising identifying a pose of the subject in the extracted video frames.

15. The method of claim 14, further comprising converting the pose of the subject and the orientation of the infant into a map.

16. The method of claim 11, further comprising providing output reorientation instructions as an indication of the desired orientation on the display.

17. The method of claim 11, wherein the video images are displayed in combination with the reorientation instructions in real time.

18. A non-transitory computer readable medium storing instructions for providing assistance during bottle-feeding that, when executed by a processor, cause the processor to:
extract video images captured of a subject bottle-feeding an infant using a bottle;
identify the infant within the extracted video frames;
determine an orientation of the infant by extracting key points from each extracted video frame corresponding to key locations on the infant;
identify the bottle within the extracted video frames;
determine an orientation of the bottle;
determine a required reorientation of the bottle and/or the infant in order to reach a desired orientation between the bottle and the infant; and
cause reorientation instructions to be output to a display for displaying the reorientation instructions or to an audio output system for providing the reorientation instructions using audio signals, wherein the reorientation instructions assist the subject in reorienting the bottle and/or infant to the desired orientation.

19. The non-transitory computer readable medium of claim 18, wherein the instructions further cause the processor to control the display to display the video images, and to display the reorientation instructions overlaid over the video images in real time.

20. The non-transitory computer readable medium of claim 18, wherein the instructions cause the processor to determine the orientation of the infant by running the image frames through a neural network to extract the key points from each extracted video frame.

* * * * *